Sept. 23, 1947.  E. R. GOODLETT  2,427,853
AIRCRAFT CONSTRUCTION
Filed Feb. 23, 1944
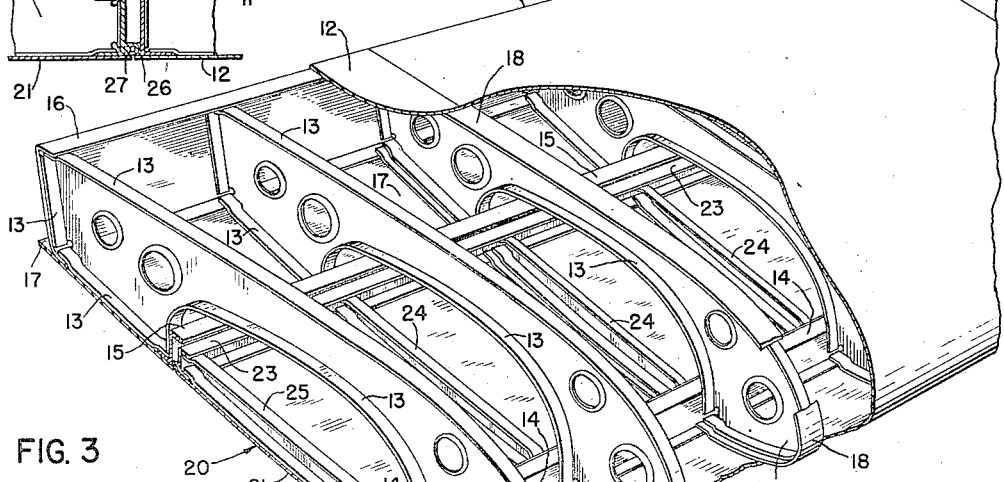
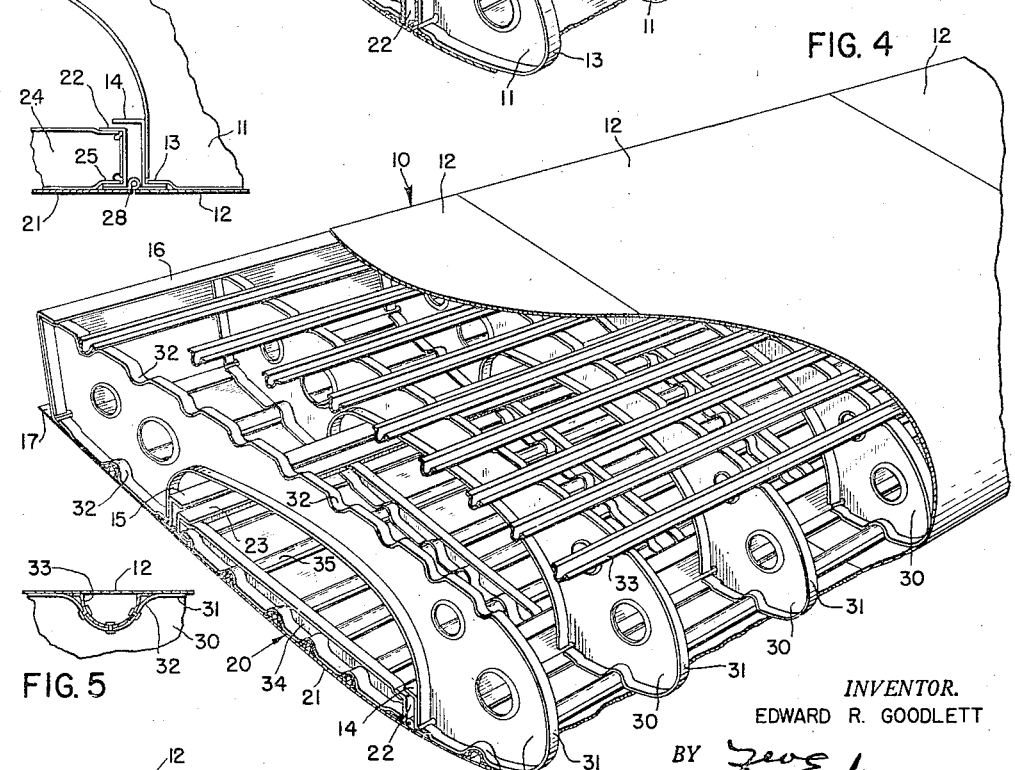
INVENTOR.
EDWARD R. GOODLETT
BY *[signature]*
ATTORNEY Patented Sept. 23, 1947

2,427,853

UNITED STATES PATENT OFFICE 2,427,853

AIRCRAFT CONSTRUCTION

Edward R. Goodlett, Ferguson, Mo., assignor to Curtiss-Wright Corporation, a corporation of Delaware Application February 23, 1944, Serial No. 523,777

4 Claims. (Cl. 244—123)

This invention relates to aircraft construction and more particularly is concerned with improved structural arrangements for aerodynamic bodies such as supporting wing members and control surfaces of airplanes.

The present invention is exemplified by the improvement in structural arrangements which eliminates the need for spars or even separate box-like members to which leading edge and trailing structures are attached. As a result, substantially all of the elements which make up the body are structural members and as such are essential to the strength of the whole airfoil. Thus the structure can be stripped of all extraneous and unnecessary parts, which results in a saving in weight. One embodiment of the invention comprises a monocoque airfoil structure made up of skin panel sections which extend generally chordwise such that the adjacent and abutting edges form a seam in the chordal direction. These sections or panels are braced by transversely positioned cut-out ribs having a suitable configuration for the formation of the airfoil body. The chordal seams may be butt welded, or may be joined by means of suitable wide-flange ribs or doublers for adequate joint strength. The structure, in one form, is marked by the absence of the more usual longitudinal stiffening elements such as stringers. The structure terminates forwardly of the trailing edge in a closure panel. A feature of this construction appears in the arrangement of elements so that a removable lower skin panel can be incorporated for ready accessibility and without unnecessarily weakening the whole structure, the margins of the opening being suitably reinforced by stiffeners which, in turn, serve as structural elements of the body along with the panel assembly.

Another and modified arrangement embodies the essential features of the monocoque construction described above but is distinguished by the addition of longitudinal members or stringers which may be united with the skin panels directly or may be assembled with the ribs to constitute an integral semimonocoque frame structure prior to the assembly of the covering skin panels. In this alternate arrangement the rib elements are, as before noted, cut out to a considerable extent such that a continuous, longitudinal spacious cavity is provided within the airfoil body. Removable panels or even a single continuous removable panel can then be incorporated, preferably in the lower surface of the airfoil, such that accessibility to the interior thereof is facilitated. The removability of certain panels is of material aid, first in the assembly and securement of the several elements and parts which go to make up the airfoil body, and second, for the more advantageous arrangement of operating units for the airplane.

Accordingly, a principal object of the invention is the provision of a structural member or body of airfoil configuration and consisting of a suitably reinforced shell which is fully capable of carrying all the bending, torsion and shear loads with the result that the use of spars or separate primary beam elements is obviated, thereby greatly simplifying the arrangement and the number of parts and also the assembly of such airfoil members.

An additional object is to provide an airfoil body in which substantially all the material thereof serves a structural function, and wherein provision is made to facilitate its production by the incorporation of one or more removable panels to the end that interior accessibility is made easy and blind securement operations substantially eliminated.

Yet a further object is to arrange the body envelope or airfoil covering panels so that joints and seams formed therebetween may, if desired, extend transversely of the spanwise dimension of the body, this arrangement being particularly advantageous in that a smooth, low-drag surface obtains.

A still further object is to improve the weight and load resisting characteristics of a cantilever type beam, as represented by an airfoil body, so that the skin thickness may be selectively reduced from root to tip in a step-wise manner without materially increasing drag effects thereof, or may be tapered uniformly toward the tip of the body.

Other objects and advantages will appear or be noted as the description proceeds particularly in connection with the preferred embodiments of this invention, the same being illustrated in the accompanying drawing, in which:

Fig. 1 is a fragmentary view, in perspective, of an airfoil body embodying the principles of the invention, certain portions being broken away for better illustration of details, Fig. 2 is a fragmentary sectional elevation taken through the structural connection between the airfoil body and a removable panel arrangement shown in Fig. 1, Fig. 3 is a fragmentary sectional elevation of a modified structural connection also applicable to the showing of Fig. 1, Fig. 4 is a fragmentary view, in perspective, of an alternate airfoil body in which portions have been broken away for a better understanding of the modified details, Figs. 5 and 6 illustrate, in fragmentary sectional elevation, alternate means for securing the parts of the airfoil body of Fig. 4.

Referring to Fig. 1 of the drawing, there is shown an airfoil body 10 which comprises a series of transversely arranged, laterally or spanwise spaced forming and supporting rib members 11 adapted to be secured to and enclosed by panel-like skin sections 12 whereby a monocoque or shell structure is formed. The rib members 11 are each initially formed with a substantial cut-out or recess opening from the lower margin, and in the forming process a peripheral flange 13 is provided for initial stiffness. Also, a series of perforations or lightening holes are formed in each of these rib members so that a saving in weight may be had according to the prevailing practice. Each rib member 11 is given an airfoil configuration or form, and with a progressive reduction in overall dimensions from one rib to the next a desirable taper from root to tip of the airfoil body may be established.

These rib elements 11 are initially assembled and secured in spaced apart position by the longitudinally extending, extruded Z-shaped members or stiffener elements 14 and 15 positioned respectively along the front and rear margins of the cut-out portion of each rib element, thereby defining with the rib cut-outs a longitudinally or spanwise extending cavity within the interior of the body. The web portions of these members are secured to the rib flanges 13 by spot welding or in some other suitable manner and the securement of a longitudinally extending, trailing edge closure panel 16 at the rear margins of the rib members will serve further to unite the several ribs in a semi-rigid frame or skeleton structure. The whole structure is made substantially rigid and resistant to bending loads by the addition of the stressed-skin panels 12 which are wrapped about the rib elements from the zone of the forward beam 14, around the leading edge or nose formation of the ribs and back to the rear margin adjacent and overlying the flanged closure panel 16. Each of these skin panels 12 is spot welded or otherwise secured to the rib flanges 13 at suitable intervals, thus making the structure an integral body. The lower surface of the body 10 rearwardly of longitudinal stiffener 15 is formed of one or more spot welded secondary skin panels 17 as desired. The primary skin panels 12 may be arranged as shown in Fig. 1 in which case the panels are placed in abutting relation and a backing strip or doubler 18 is employed to effect the joint. The resulting seam is arranged to overlie the rib member, as shown, it being considered conducive to a more rigid structure. These stressed-skin panels 12 and 17 may have a uniform thickness or may be tapered uniformly from a relatively thick root section to a thin tip section. Another arrangement of some merit is to reduce the skin thickness between panels as in a stepped construction.

It will be observed from Fig. 1 that the body 10 is made up of a minimum number of parts, that the parts are individually simple and easily fabricated and that assembly problems are few since interior accessibility is manifestly improved by the provision of an interior cavity or tunnellike space through the longitudinal extent of the body as defined by the cut-out portions of the several rib members. Upon completion of the body assembly, the interior cavity or space is closed by a removable door 20. This door is adapted to fit into the body contour and is provided with an outer surface panel 21 which forms a continuation of the skin panels 12 and 17 in bridging the gap between the beam members 14 and 15. With this closure member or door 20 securely anchored in place the body 10 is rendered fully resistant to bending and torsional loads.

The closure door referred to is comprised of one or more skin panels 21 reinforced by longitudinal channel members 22 and 23 spot welded or suitably secured along the front and rear margins and by a plurality of transverse shallow rib members 24 having flanges formed about the periphery thereof, as at 25. The door securing means consists of a detachable structure disposed between and extending throughout the length of the beam members 14, 22 and 15, 23 and is preferably made an integral part of these beams. As shown in Fig. 2 the Z-section beam or stiffener 14 is formed with a projecting boss 26 at its base portion adjacent the edge of the skin panel 12 and this boss is longitudinally drilled or otherwise provided with a bore and is also mutilated or cut away at spaced zones to provide one half of a continuous hinge member. The adjacent channel stiffener 22 is likewise provided with a boss 27 which is treated in a manner similar to the boss 26 so that the series of perforated projections fit together in inter-leaved relation to constitute a complete hinge of continuous type. A hinge pin may then be inserted in the pin receiving bore for locking the beams 14 and 22 in cooperating position. The rear stiffener members 15 and 23 are formed in a similar manner whereby upon placing of the door 20 in closed position, Fig. 1, it may be fixed in position by a second hinge pin. It is obvious that the door or panel forming member 20 may be swung downwardly from either the front or rear hinge assembly, and it can be entirely removed in sections or as an integral unit.

An alternate hinge assembly is shown in Fig. 3 and it comprises, as its principal difference, the arrangement of a continuous hinge structure 28 which is separate and independent of the associated and adjacent stiffener beams 14 and 22. Its assembly may be effected by a spot welding procedure or by riveting or bolting to the adjacent flanged portions of the primary body ribs 11 and the secondary door ribs 24. The flanged margins of the beam-like stiffeners 14 and 22 are shown as being disposed between the hinge plates and the body rib flange 13 and door rib flange 25 respectively.

An alternate and equally advantageous airfoil construction which conforms in general with the essential features of the above described airfoil body 10 is shown in Fig. 4. Here the airfoil body 10 has the same outward configuration and appearance as that in Fig. 1, and is enclosed or enveloped by stressed skin panels 12 in a manner heretofore described. A plurality of transverse ribs 30 of general airfoil configuration but reduced in overall dimensions from one rib to the next in the spanwise direction for attainment of a desirable taper are each formed with a peripheral flange 31 which is further formed to provide a series of spaced depressions or semi-circular recesses 32 in the outer margins which lie adjacent the skin panels 12. With ribs of this form it is then possible to utilize stringer members 33 of a general channel section and to distribute a suitable number of these stringers over the chordwise extent of the airfoil in the manner indicated. The major part of this airfoil body is completed by the stiffening beams 14 and 15 already noted in connection with Fig. 1 as being secured along the front and rear margins of the longitudinally extending opening formed in the lower surface of the body. This construction is more exactly defined as a semimonocoque body.

Referring to Fig. 5, there will be observed an enlarged detail view of the structural assembly of ribs, stringers and outer skin surface which can be taken as typical of a preferred construction. In this view the stringer 33 occupies a recess 32 in a rib 30 and is riveted, spot welded or otherwise secured to the flange 31 of the rib and to a skin sheet or panel 12. As a result the entire body is structurally united and becomes a strong member having excellent characteristics in bending. A modified assembly arrangement shown in Fig. 6 includes the securement of the stringers 33 only to the skin panels 12 so that the skin panels and stringers form the column member.

The airfoil body 10 of Fig. 4 is provided with a closure door structure 20 having the general features similar to the door structure described in connection with Figs. 1, 2, and 3. However, the door rib members 34 are suitably recessed along the marginal flange which abuts the door skin panel 21 to accommodate a series of longitudinally extending, channel-shaped stringers 35. The fore and aft margins of this door are strengthened and stiffened by the members 22 and 23 respectively, while a continuous type hinge structure is utilized to effect the assembly of the door in a detachable manner.

While the foregoing discussion has dealt with two preferred embodiments of the present invention, it should be understood that certain modifications and rearrangements may be made or will be suggested from a study of the features and parts herein disclosed and described. The most obvious modifications include the substitution for the metal parts and elements described of any other suitable materials which may be adapted to the construction of airfoil bodies. It is also to be pointed out that this shell-type airfoil construction has many other advantages not heretofore found. For example, the structural arrangement of the present airfoil body provides that all of the elements play a structurally useful part in the overall resistance to bending and torsional forces. The exceptionally clear, unobstructed interior space of the shell body greatly facilitates or helps what has been before a problem of assembly and practically eliminates the necessity for blind assembly operations. Moreover, the sectional arrangement of skin panels and former ribs makes possible a continuous graduation of skin thickness in proportion to the loads to be carried. The present arrangement of this invention will materially increase the serviceability of the airfoil in the event of damage and will also facilitate the interior accessibility both for initial assembly and for later inspection and repair. A further important feature resides in the spanwise chamber or space in the shell body permitting a better arrangement of the necessary and essential operating accessories and adjuncts usually positioned within the wing member of an airplane; or, in connection with control surfaces for the better distribution and arrangement of such actuating mechanism.

What is claimed is:

1. In an airfoil structure of the character described, the combination of transversely arranged rib elements, each of said ribs having a recess opening from a lower marginal edge and intermediate the length thereof, said recesses together defining a longitudinally extending space within the airfoil structure, skin panels enveloping the ribs, one of said skin panels being positioned over the longitudinally extending space to form a closure therefor, longitudinally extending elements secured to said ribs along opposite margins of the space thus formed within the airfoil structure, other longitudinally extending elements secured to the opposite margins of the closure panel for cooperation with the said first mentioned longitudinally extending elements in forming a support for said closure panel, and means for detachably connecting the closure panel upon positionment of said other longitudinally extending elements adjacent the first mentioned cooperating elements secured to said ribs.

2. In an airfoil structure, the combination of transversely arranged ribs, each of said ribs having a recess opening from a lower marginal edge, intermediate the length thereof, said rib recesses together defining a longitudinally extending space within the airfoil structure, longitudinally extending stringers secured to said ribs, skin panels enveloping and being secured to said ribs and stringers, one of said skin panels being positioned over the recess space to form a closure therefor, longitudinally extending elements secured to said ribs along opposite margins of the space thus formed within the airfoil structure, other longitudinally extending elements secured to the opposite margins of the closure panel and arranged for cooperation with said first mentioned longitudinally extending elements in providing a support for said closure panel, and means for detachably connecting said cooperating longitudinal elements whereby said closure panel may be removed to afford access to the interior of the airfoil structure.

3. In an airfoil, a plurality of spaced airfoil ribs each having a recess opening inwardly from a marginal edge thereof between the fore and aft portions of the rib, said recesses together defining a cavity extending spanwise within the airfoil, a panel bridging said cavity for providing a load transmitting connection between the fore and aft portions of said ribs along the recessed edges thereof, said panel having ribs substantially aligned with the airfoil ribs, members extending along the cavity and joined to said airfoil ribs, the panel having members extending along the cavity and joined to the panel ribs, and means connecting the members joined to the panel ribs to the members joined to the airfoil ribs, said connecting means being arranged to permit displacement of the panel for providing access to the cavity.

4. In an airfoil, a plurality of spaced ribs each having a recess opening from a lower marginal edge and intermediate of the length thereof, said recesses together defining a cavity opening from the lower surface of the airfoil and extending spanwise within the airfoil, spanwise extending elements secured to said ribs along opposite margins of the cavity, a panel for closing the cavity at the lower surface of the airfoil, said panel having a spanwise extending element adjacent each of the first mentioned spanwise extending elements for cooperation therewith in forming a support for the closure panel, and means connecting adjacent spanwise extending elements arranged to permit displacement of the panel for providing access to the cavity.

EDWARD R. GOODLETT.

REFERENCES CITED

The following references are of record in the file of this patent:

UNITED STATES PATENTS

| Number | Name | Date |
|---|---|---|
| 2,233,969 | Woods | Mar. 4, 1941 |
| 2,349,454 | O'Hare et al. | May 23, 1944 |
| 1,613,602 | Birmingham | Jan. 11, 1927 |
| 1,890,820 | Markey | Dec. 13, 1932 |
| 1,533,312 | Fokker | Apr. 14, 1925 |

FOREIGN PATENTS

| Number | Country | Date |
|---|---|---|
| 480,269 | Great Britain | Feb. 21, 1938 |
| 507,973 | Great Britain | June 23, 1939 |
| 617,282 | France | Nov. 19, 1926 |